April 23, 1968 A. BRAND 3,379,353

POSITIVE PRESSURE BUFFER DEVICE FOR MAGNETIC TAPE TRANSPORT

Filed Oct. 22, 1965

INVENTOR.
ABRAHAM BRAND
BY
Christie, Parker & Hale
ATTORNEYS.

United States Patent Office 3,379,353

Patented Apr. 23, 1968

3,379,353

POSITIVE PRESSURE BUFFER DEVICE FOR MAGNETIC TAPE TRANSPORT

Abraham Brand, Van Nuys, Calif., assignor to Consolidated Electrodynamics Corporation, Pasadena, Calif.

Filed Oct. 22, 1965, Ser. No. 501,413
5 Claims. (Cl. 226—29)

ABSTRACT OF THE DISCLOSURE

This application describes a magnetic tape transport having a loop-forming buffer between each reel and the region of the recording head, in which the loop, under positive air pressure, forms into a substantially free full circle without any external restraint on the shape of the loop. While any momentary decrease in diameter of the loop is resisted by an increase in pressure with the enclosed volume formed by the loop, the effective area of the loop is reduced so that the net tension on the tape is substantially constant.

This invention relates to magnetic tape transports and, more particularly, is concerned with a magnetic tape transport having improved buffer storage means positioned between the magnetic tape reels and the transducer heads.

It is well known in high speed, high performance magnetic tape transports to provide tape storage buffering between the reels and an operational zone in which the tape is driven past the record and playback heads. Slack loops are provided to permit different acceleration of the reels and of the tape through the operational zone. Vacuum columns or so-called "wobbly arms" in which the tape is wound in serpentine fashion over a series of guide rollers, which are movable relative to each other, or combinations of vacuum columns and wobbly arms have been used in the past. Such known arrangements during start, stop, and reversing operations of the tape through the operational zone result in variations in tape tension, causing small perturbations in the movement of the tape through the operational zone. Such perturbations result in some distortion of the reproduced signal.

The ideal configuration for a tape transport suggests that some means be provided for isolating the magnetic tape in the region of the reels from the magnetic tape in the region of the operational zone that would control the reels to feed the tape in and out of the operational zone at the proper rate, would provide for sufficient storage of excess tape to allow for variations in the tape feed rate in the operational zone and at the reels, and would not reflect or transmit any changes in tape tension to the operational zone. Such buffering apparatus should ideally have no inertia and show a substantially zero spring rate. Vacuum columns have been used in the past as most closely approaching the ideal conditions for buffering between the reels and the operational zone. However, vacuum columns introduce substantial friction because the air pressure presses the tape against the walls of the vacuum column. This friction results in a large static build-up which has proved extremely troublesome. Furthermore, any rapid movement of the tape loop within the vacuum column results in an abrupt change in the pressure differential across the tape loop resulting in corresponding variations in tape tension, since the area of the tape loop does not change. These variations in tape tension result in perturbations in the movement of the tape through the operational zone, due to stretching and deformation of the tape with changes in tension.

The present invention provides an improved arrangement for isolating the tape in the operational zone from the effects of the reeling system. The present invention has the advantage over the wobbly arm type of buffer in that it is a very low mass, low inertia, low spring rate type of system which approaches the ideal condition defined above. It has the advantage over vacuum column type buffers in that frictional contact between the magnetic tape and any rubbing surfaces is substantially eliminated, thus preventing the build-up of static charge on the magnetic tape. The buffer arrangement is self-compensating in that sudden changes in the length of tape in the buffer region result in substantially no change in tape tension.

These and other advantages of the present invention are achieved by means of a tape storage arrangement located between each of the reels and the operational zone of a magnetic tape transport system. The tape storage comprises a pair of closely spaced guide members with the tape passing in a loop through the small space between the guide members, the loop extending to one side of the guide members. Means defining a pair of flat parallel surfaces adjacent the guide members are located at opposite edges of the tape in the loop so that the loop and parallel surfaces form a fully enclosed volume. Air is introduced from a high impedance source at a pressure substantially above atmospheric pressure within this confined volume. The elevated pressure causes the tape loop to form into a substantially closed circular shape. Means is provided for sensing the diameter of the circular loop and means responsive to the loop diameter sensing means controls the speed of rotation of the associated reel so as to maintain the diameter of the loop substantially constant as the tape passes between the reel and the operational zone. The surface of the tape in the loop is not in rubbing contact with any confining walls which limit the size or shape of the loop.

For a more complete understanding of the invention, reference should be made to the accompanying drawings wherein.

Figures 1, 2:
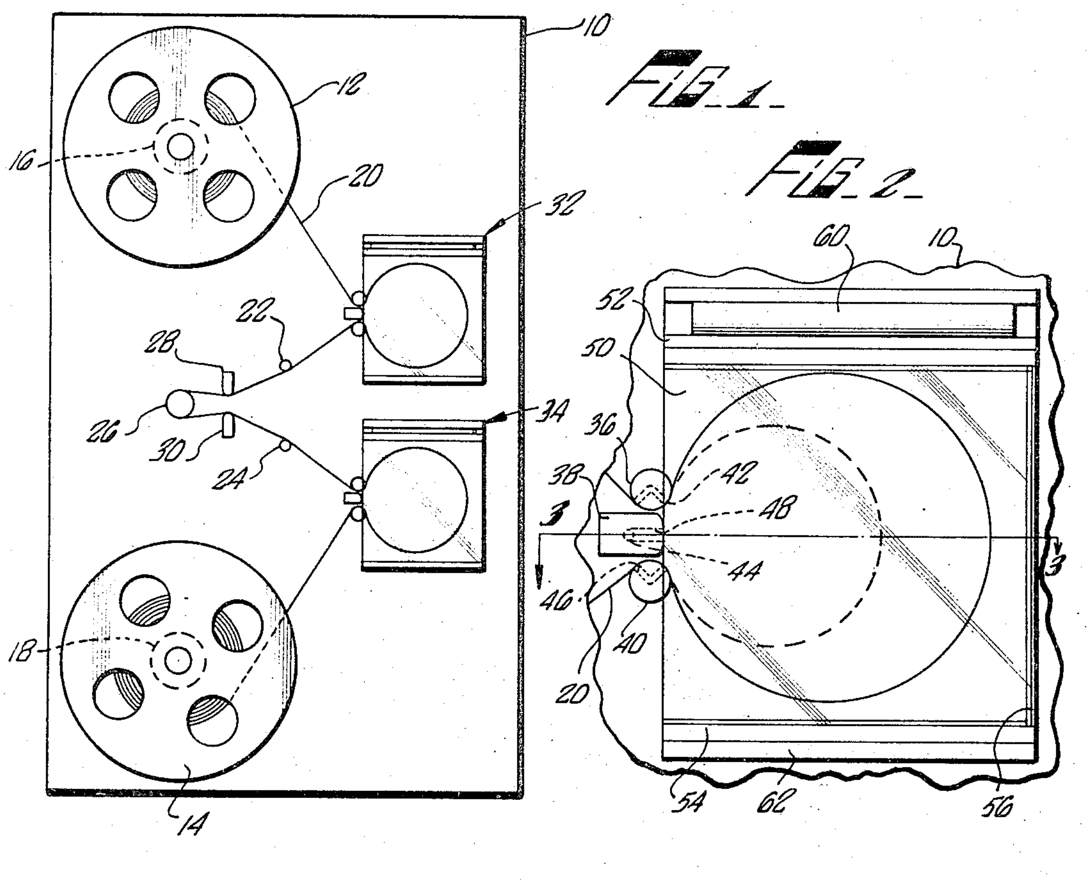
FIGURE 1 is a schematic showing of one embodiment of the present invention.
FIGURE 2 is an enlarged view of the loop forming and sensing portion of the transport of FIGURE 1.

Referring to FIGURE 1 in detail, the numeral 10 indicates generally a frame plate forming a magnetic tape transport deck. Mounted for rotation on the frame 10 are a supply reel 12 and a take-up reel 14, respectively driven by reel motors indicated at 16 and 18, and positioned below the deck 10. Magnetic tape 20 is directed from the supply reel 12 to the take-up reel 14 through an operational zone which includes a pair of guide rollers 22 and 24 which form a loop in the magnetic tape, the loop passing around a capstan 26 which is driven by a constant speed capstan drive motor (not shown). In passing between the rollers 22 and 24 and the capstan 26, the tape 20 passes over a pair of magnetic heads 28 and 30. Tape transport as thus far described is of conventional design.

The present invention is directed to a pair of buffers or isolators, indicated generally at 32 and 34, positioned between the operational zone and the respective reels 12 and 14, and which serve as a buffer between the reel drive system and the capstan drive. The isolators prevent any perturbations in tape velocity produced by the reel drive system from affecting the constant linear velocity of the tape as it moves past the magnetic heads 28 and 30.

Figure 3:
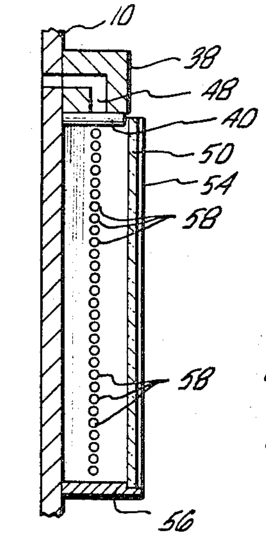
FIGURE 3 is a sectional view taken substantially on the line 3—3 of FIGURE 2.

Details of one of the isolators are shown in FIGURES 2 and 3. The magnetic tape 20 in passing from a reel to the operational zone is directed over a first guide post 36 through a loop under a guide post 38, and back up over a guide post 40. Each of the guide posts is provided with air passages, indicated at 42, 44 and 46, which are connected to a source of positive air pressure (not shown). The passages 42 and 46 providing air bearings for the tape as it passes over the guide posts. The passage 44 in the center post 38 communicates with a series of downwardly extending openings 48 which direct air under pressure against the magnetic tape 20 forming a loop in the tape. The openings are of small diameter to provide a high impedance source, i.e., provide constant flow rate over a wide range of pressures.

The tape loop between the guides 36 and 40 passes between two parallel surfaces, one of which is defined by the surface of the tape deck 10 and the other of which is formed by a plate 50. The plate 50 is spaced from the deck 10 by an amount equal to the width of the tape so that the tape loop in combination with the confining surfaces and the guide posts 38 forms a substantially fully enclosed volume into which the air from the openings 48 is directed. A positive pressure is developed within the tape loop causing the tape to be put under tension and to assume a substantially cylindrical shape.

The plate 50 is supported and spaced in parallel relationship to the surface of the deck 10 by side walls 52 and 54 and the bottom wall 56. The side and bottom walls are spaced far enough from the guide posts 36, 38 and 40 so that they do not interfere with or contact the tape in the loop under normal operating conditions. Side walls 52 and 54 are provided with a row of openings, as indicated at 58 in FIGURE 3. An elongated light source 60 is positioned adjacent the outside of the side wall 52 so as to illuminate the row of holes 58. A layer of photoresistive material 62 is positioned outside of the side wall 54. The tape loop casts a shadow between the light source 60 and the photo-resistive material 62 which varies in length as the size of the loop is changed. Thus the photoresistive layer 62 provides a means for controlling an output signal which is proportional to the diameter of the loop.

Figure 4:
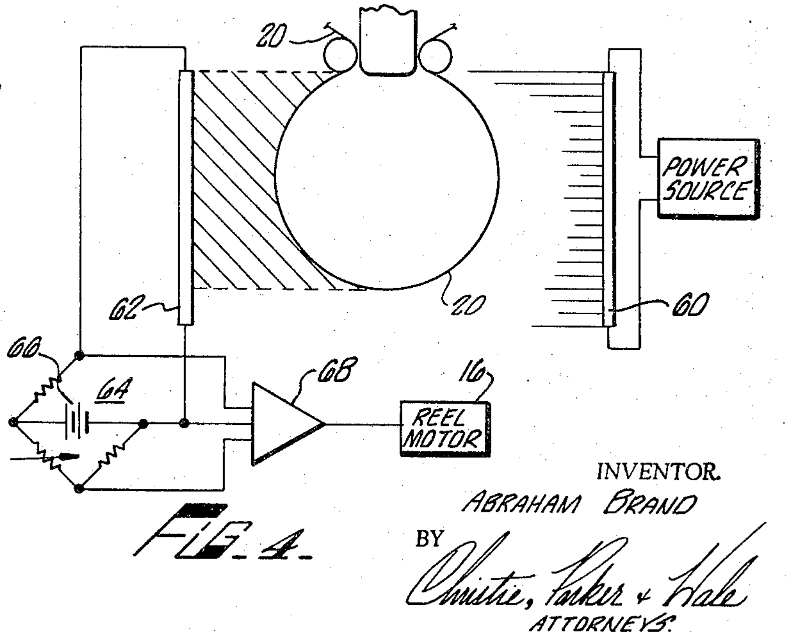
FIGURE 4 is a diagrammatic showing of the loop sensing and control servo.

As shown schematically in FIGURE 4, as the diameter of the loop changes, the length of the shadow cast by the loop on the photo-resistive layer by the light source changes. Photo-sensitive layer 62 is connected as one arm of a resistance bridge 64. One diagonal of the bridge 64 is connected across a potential source 66 while the other diagonal of the bridge is connected across the input of a differential amplifier 68. The output of the differential amplifier 68 controls a reversible reel motor 16.

In operation, as the capstan 26 rotates, withdrawing tape from the one loop and adding tape to the other loop, the size of the respective loops vary in diameter. This change in diameter in turn controls the respective reel motor to feed tape between the reel and the loop so as to maintain the loop at substantially constant diameter. Any rapid changes in tape loop diameter due to velocity perturbations at the associated reel result in small changes in the volume of the space within the tape loop. This volume acts like a closed cylinder so that any changes in volume result in a corresponding change in pressure. Thus a momentary increase in the diameter of the loop increases the volume and decreases the pressure, making the system self-compensating. This tends to keep the tape under constant tension with small rapid changes in loop diameter, so that no tension changes are transmitted to the operational zone.

Because the magnetic tape is normally not in contact with the surrounding walls as in the case of the vacuum column type of buffer, friction and an accumulation of static charge which are so troublesome in the operation of vacuum columns are avoided. The system also has the advantage that a single high pressure source is used for the entire system to feed the air bearings at the guide posts as well as for maintaining the loops.

What is claimed is:

1. In a tape transport system in which tape is driven through an operational zone, apparatus for isolating the tape as it is driven through the operational zone from perturbations produced by the driving and guiding operation, comprising a pair of guide members positioned adjacent the operational zone, the tape passing in a loop between the guide members, means defining a pair of parallel flat surfaces spaced apart by a distance substantially equal to the width of the tape and positioned adjacent the guide members so that the tape loop passing between the guide members extends into the space between said surfaces, whereby the loop and parallel surfaces define a substantially enclosed volume, means for admitting air at above atmospheric pressure into said enclosed volume to expand the tape loop into a free-formed substantially circular shape, the length of tape in the loop being at least twice the space through which the loop passes between the guides to permit the loop to form into a substantially complete circle, means for maintaining the diameter of the loop substantially constant as tape passes between the reel and the operational zone, the space between the guides through which the loop passes being very much smaller than said diameter of the loop.

2. In a tape transport system in which tape is transferred between two reels and driven through an operational zone, apparatus for isolating the tape as it is driven through the operational zone from perturbations produced by the reeling operation, comprising a pair of closely spaced guide members positioned between one of the reels and the operational zone, the tape passing in a loop between the guide members, means defining a pair of parallel flat surfaces spaced apart by a distance substantially equal to the width of the tape and positioned adjacent the guide members so that the tape loop passing between the guide members extends into the space between said surfaces, whereby the loop and parallel surfaces define a substantially fully enclosed volume, means for maintaining the pressure in said enclosed volume greater than the pressure outside the enclosed volume, the length of the tape in the loop being at least twice the space between the guides to permit the loop to form into a substantially complete circle, means sensing changes in the diameter of the circular loop, and servo means responsive to said sensing means for controlling the speed of rotation of the adjacent reel to maintain the diameter of the loop substantially constant as tape passes between the reel and the operational zone, the margins of said parallel flat surfaces being sufficiently large to permit the loop to assume an unrestricted free circular shape formed by the greater pressure within the loop, whereby the surface of the tape in the loop makes no frictional contact with any restraining surfaces.

3. Apparatus as defined in claim 2 wherein the servo means controls the diameter of the tape loop such that the diameter is substantially greater than the spacing between the guide members.

4. In a tape transport system in which tape is driven through an operational zone, apparatus for isolating the tape as it is driven through the operational zone from perturbations produced by feeding of the tape, comprising a pair of spaced guide members positioned between one of the reels and the operational zone, means defining a pair of parallel flat surfaces spaced apart by a distance substantially equal to the width of the tape and positioned adjacent the guide members, means for guiding the tape in a loop extending through the space between the guide members, means for introducing air under pressure against the inside of the tape loop to expand the tape into a substantially circular shaped loop within the space between the flat surfaces, means for maintaining the length of tape in the circular loop substantially greater than 180° of arc.

5. Apparatus as defined in claim 4 wherein said means for introducing air includes means providing a high impedance to air flow so as to provide substantially constant flow rate over a wide range of air pressure changes within the tape loop.

References Cited

UNITED STATES PATENTS

| | | | |
|---|---|---|---|
| 3,180,547 | 4/1965 | Gruczelak et al. | 226—118 |
| 3,297,221 | 1/1967 | Licht et al. | 226—97 |
| 2,796,223 | 6/1957 | Detweiler | 242—75.3 |
| 3,289,960 | 12/1966 | Willis | 242—55.12 |

LEONARD D. CHRISTIAN, *Primary Examiner.*